United States Patent [19]

Shaffer et al.

[11] Patent Number: 6,100,354
[45] Date of Patent: *Aug. 8, 2000

[54] OLEFIN COPOLYMERS FROM BRIDGED BIS(ARYLAMIDO) GROUP 4 CATALYST COMPOUNDS

[75] Inventors: Timothy Daniel Shaffer, Houston; Kevin Richard Squire, Kingwood, both of Tex.

[73] Assignee: Exxon Chemical Patents Inc., Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/803,687

[22] Filed: Feb. 24, 1997

[51] Int. Cl.$^7$ ....................................................... C08F 4/00
[52] U.S. Cl. .......................... 526/161; 326/160; 326/141; 326/348; 326/348.7; 502/103; 502/123
[58] Field of Search .................................... 526/161, 160, 526/141, 348, 348.7; 502/103, 123

[56] References Cited

U.S. PATENT DOCUMENTS

| | | |
|---|---|---|
| 4,774,301 | 9/1988 | Campbell, Jr. . |
| 5,318,935 | 6/1994 | Canich et al. . |
| 5,444,145 | 8/1995 | Brant et al. . |
| 5,448,001 | 9/1995 | Baird . |
| 5,475,075 | 12/1995 | Brant et al. . |
| 5,541,350 | 7/1996 | Murata et al. ........................... 526/127 |
| 5,763,556 | 6/1998 | Shaffer et al. ........................... 526/160 |

FOREIGN PATENT DOCUMENTS

| | | |
|---|---|---|
| 0 099 646 | 2/1984 | European Pat. Off. . |
| 0 349 886 A2 | 10/1990 | European Pat. Off. . |
| 0 349 886 A3 | 10/1990 | European Pat. Off. . |
| 34 44 111 | 6/1986 | Germany . |
| 57-003804 | 1/1982 | Japan . |
| WO 95/29940 | 11/1995 | WIPO . |
| WO 97 44370 | 11/1995 | WIPO . |

OTHER PUBLICATIONS

"Insertion Polymerization," Encycl. of Polm. Sci. and Eng., vol. 8, p. 175 (Wiles Interscience, 1988).

"Polymerization of α–Olefins by Chelating Diamide Complexes of Titanium," Scollard, J.D., et al, Macromolecules 29, p. 5241–5243 (1996) with supplemental material p. 1–22.

"Sterically Demanding Diamide Ligands: Synthesis and Structures of d$^0$ Zirconium Alkyl Derivatives," Scollard, J. D., et al, Organometallics 14, p. 5478–5480 (1995), with supplemental material p. 1–10.

"Aliphatic Olefins," Cationic Polymerization of Olefins: A Critical Inventory, J. P. Kennedy, p. 53–67 John Wiley & Sons (1975).

"Isotactic Polymerization of Olefins with Homogeneous Zirconium Catalysts, " Transition Metals and Organometallics as Catalysts for Olefin Polymerization, W. Kaminsky, et al, Springer–Verlag, pp. 291, 296 (1988).

"Aliphatic Olefins, " Cationic Polymerization of Olefins: A Critical Inventory, J.P. Kennedy, pp. 53–67 John Wiley & Sons (1975).

"Polymerization of α—Olefins by Chelating Diamide Complexes of Titanium," Scollard, J.D., et al., Macromolecules 29, pp. 5241–5243 (1996) with supplement amterial pp. 1–22.

"Sterically demanding Diamide Ligands: Synthesis and Structures of d°Zirconium Alkyl derivatives," Scollard, J.D., et al, Organpmetallics 14, pp. 5478–5480 (1995) with supplemental material pp. 1–10.

*Primary Examiner*—David W. Wu
*Assistant Examiner*—Ling-Siu Choi
*Attorney, Agent, or Firm*—William G. Muller; Joseph F. Reidy

[57] ABSTRACT

A process for preparing substantially random olefin copolymers containing geminally disubstituted olefin monomers is described. The geminally disubstituted olefin monomers can be represented by the generic formula $R_1=R_2(R_3)(R_4)$, where $R_1$ is $CH_2$, $R_2$ is C, and $R_3$ and $R_4$ are, independently, essentially linear hydrocarbyl groups having from 1 to 30 carbon atoms, or more, and containing one carbon atom bound directly to $R_2$. The copolymers can be prepared by contacting at least one geminally disubstituted olefin monomer and one or more comonomers selected from the group consisting of ethylene and $C_3$–$C_{20}$ α-olefins, optionally with one or more other coordination polymerizable monomers, with a active coordination catalyst system comprising a bridged bis(arylamido) Group 4 catalyst component.

16 Claims, No Drawings

OLEFIN COPOLYMERS FROM BRIDGED BIS(ARYLAMIDO) GROUP 4 CATALYST COMPOUNDS

FIELD OF THE INVENTION

The present invention relates to α-olefin copolymers containing at least one species of geminally disubstituted olefin monomer and a polymerization process for preparing them. More particularly, the invention is directed to a process for copolymerizing α-olefins and geminally disubstituted olefin monomers in the presence of bridged bis(arylamido) Group 4 catalyst compounds, and the polymers from it.

BACKGROUND OF THE INVENTION

Insertion, or coordination, polymerization is a well-known chemical reaction sequence for preparing polymers and copolymers of ethylene, α-olefins, non-conjugated diolefins and cyclic olefins. In particular, coordination polymerization with Group 4 metallocene catalyst systems is now well-known. Traditional Ziegler monomers, e.g., ethylene and α-olefins, such as propylene, 1-butene, 1-hexene, and 1-octene, are readily polymerized in the presence of Group 4 transition metals having, as ligands at least one η-5 bound cyclopentadienyl ligand and two univalent anionic ligands where the univalent ligands can be abstracted by an cocatalyst compound so that an activated catalyst compound capable of olefin insertion polymerization is formed.

Geminally disubstituted olefin monomers, such as isobutylene, have been thought to be largely incapable of polymerization by insertion, or coordination, mechanisms. In the chapter on "Insertion Polymerization", *Encycl. of Polm. Sci. and Eng.*, vol. 8, p. 175 (Wiley Interscience, 1988), the statement is made that ". . . 1,1-disubstituted α-olefins are neither homo- nor copolymerized with other monoolefins." Instead such disubstituted α-olefins are typically polymerized and copolymerized by cationic or carbocationic polymerization with Lewis acid catalyst systems known to initiate the formation of carbocations. However, since ethylene is not readily polymerized by cationic techniques, see Kennedy, J. P., *Carbocationic Polymerization of Olefins: A Critical Inventory*, p. 53 et seq. (John Wiley & Sons, 1975), ethylene copolymers with disubstituted α-olefins are largely unknown.

Despite this prejudice in the art certain ethylene-isobutylene copolymers have been exemplified. Example E of WO 95/29940 describes ethylene/isobutylene copolymerization concurrent with the homopolymerization of both the isobutylene and the ethylene at −20° C. with bis-(cyclopentadienyl)hafnium dimethyl and bis-(pentamethylcyclopentadienyl)zirconium dimethyl, both activated by triphenylmethyl-tetrakis(perfluorophenyl) boron. The amount produced of ethylene-isobutylene copolymer was less than 1.3 weight % of the total polymer products. Copolymerization of 2-methylpropene (isobutylene) and ethylene at 30° C. and 50° C. with ethylene-bis(indenyl)zirconium dichloride when activated with methylalumoxane was reported in "Isotactic Polymerization of Olefins with Homogeneous Zirconium Catalysts", W. Kaminsky, el al, *Transition Metals and Organometallics as Catalysts for Olefin Polymerization*, page 291, 296 (Springer-Verlag, 1988). Incorporation of isobutylene was reported to be less than 2.8 mol. %, the only example illustrates 1.35 mol. %.

Non-metallocene bis(amido) Group 4 catalyst compounds are also known in the art for α-olefin polymerization. U.S. Pat. No. 5,318,935 describes bridged and unbridged bisamido transition metal catalyst compounds of Group 4 metals capable of insertion polymerization of α-olefins. The examples illustrate α-olefin copolymers and homopolymers of ethylene, propylene, 1-butene, and 1-hexene. U.S. Pat. No. 4,774,301 describes zirconium catalyst compounds corresponding to the formula $ZrXR_3$ wherein the R groups may include one or more $-NR'_2$ group, R' being alkyl or aryl of up to 12 carbon atoms. However polymerization capability for vinyl aromatic monomers and highly syndiotactic polymers of them are described and exemplified only with zirconium tetra-n-propoxide for syndiotactic polystyrene. Bridged bis(arylamido) Group 4 compounds proposed for "single site" olefin polymerization are described by D. H. McConville, et al, in *Organometallics* 1995, 14, 5478–5480. Synthesis methods and compound characterization are presented. Further work appearing in D. H. McConville, et al, *Macromolecules* 1996, 29, 5241–5243, described the bridged bis(arylamido) Group 4 compounds which upon activation with Lewis acid cocatalysts provided active catalysts for polymerization of 1-hexene. Each of these documents is incorporated by reference for the purposes of U.S. patent practice.

In view of the above, additional means of manufacturing polyolefins incorporating geminally disubstituted olefins is highly desirable. Copolymer compositions comprising α-olefins and geminally disubstituted olefins, optionally with other polymerizable olefinically-unsaturated monomers, provide new compositions useful in many applications. It also serves the function of economically utilizing the inherent feedstock make-up in petroleum refining processes where fractionation can produce commingled streams of 1-butene and isobutylene.

INVENTION DISCLOSURE

Accordingly, the invention is a polymerization process for preparing α-olefin copolymers containing at least one species of geminally disubstituted olefin monomer comprising contacting α-olefins and at least one of geminally disubstituted olefin monomer under insertion polymerization conditions with a bridged bis(arylamido) Group 4 catalyst compound. The invention includes substantially random olefin copolymers comprising one or more $C_3$–$C_{20}$ poly-α-olefin segments and copolymerized geminally disubstituted olefin monomers.

DESCRIPTION OF THE INVENTION AND EXAMPLES

The olefin copolymers of the invention will typically be substantially random olefin copolymers comprising one or more α-olefin and geminally disubstituted olefin monomers, and optionally, one or more other coordination polymerizable monomers. The term "substantially random" when used to describe copolymers of this invention means that the copolymer comprises (A) sequences of an alternating comonomer structure comprising ethylene or α-olefin and a geminally disubstituted olefin monomer randomly interrupted by (B) olefin polymeric sequences, with the characterizing feature that at least one ethylene or α-olefin monomer will be incorporated between each incorporated geminally disubstituted olefin monomer. Ethylene copolymers may be represented as copolymers comprising randomly incorporated $-(E-G)_a-$ and $-(E)_b-$ sequences where E represents a $(-CH_2-CH_2-)$ unit derived from ethylene and G represents a $(-CH_2-C(R_3)(R_4)-)$ unit derived from a geminally disubstituted monomer, $R_3$ and $R_4$ being essentially hydrocarbyl radicals as further defined below. The values of a and b are the respective mole fractions of each unit comprising the copolymer, where a+b=1. Thus "a" can be from below 0.03 to 1.00 and "b" can be from 0.00 to 0.97 and higher. Where isobutylene, for example, is available as the geminally disubstituted monomer in the reaction process in amounts permitting of high incorporation relative to the ethylene, approaching a 50/50 mol. % ratio, the value of "b" will approach zero and the polymer will approach a statistically alternating copolymer of ethylene and isobutylene.

It has additionally been found that in accordance with the invention process propylene or higher α-olefins can be copolymerized with the geminally disubstituted monomer so as to prepare substantially random α-olefin/geminally disubstituted monomer copolymers, e.g., propylene-isobutylene copolymers. Such will have the characteristics described above for ethylene copolymers, but where propylene or higher α-olefin replaces the ethylene. These copolymers may be represented as copolymers comprising randomly incorporated —(P-G)$_a$— and —(P)$_b$— sequences where P represents a branched or linear unit derived from propylene or a higher α-olefin and G represents a (—CH$_2$—C(R$_3$)(R$_4$)—) unit derived from a geminally disubstituted monomer, R$_3$ and R$_4$ being essentially hydrocarbyl radicals as further defined below. These copolymers, and olefin copolymers comprising one or more C$_3$–C$_{20}$ poly-α-olefin segments and copolymerized geminally disubstituted olefin monomers were particularly surprising in view of earlier work, both that of the art of the background description and that of co-pending application U.S. Ser. No. 08/651,030, filed May 21, 1996. That work teaches that ethylene was a requisite comonomer with geminally disubstituted olefin monomers, apparently serving to facilitate the insertion mechanism necessary to allow the incorporation of the geminally disubstituted olefin monomers. These teachings are illustrative of the capabilities of this invention process with the modification that olefins other than ethylene can be used.

Thus with the catalyst compounds according to this invention the necessity of ethylene as a limiting process condition is overcome and copolymers comprising higher olefins becomes possible. The polymers may be copolymers of one non-ethylene olefin and the one or more geminally disubstituted olefin monomers, or polymers of two or more different non-ethylene olefins with geminally disubstituted olefin monomers. The C$_3$–C$_{20}$ α-olefin polymeric segments appear from the studies conducted for this invention to be amorphous, that is prochiral olefins were not stereoregularly oriented in the polymeric segments prepared with the catalyst compounds of the invention.

As noted the substantially random copolymers according to the invention may additionally comprise one or more coordination, or insertion copolymerizable monomers, with the geminally disubstituted olefin monomers being randomly incorporated. For example, resulting terpolymers, tetrapolymers, etc., may be represented in one embodiment as a polymer comprising randomly incorporated ethylene, α-olefin and/or other coordination polymerizable monomers segments with the geminally disubstituted olefin monomers. The term "randomly incorporated" as used here means that homopolymerized geminally disubstituted olefin monomer segments are excluded, that is there are no, or at least essentially no, adjacent geminally disubstituted olefin monomers in any polymeric segments.

Geminally disubstituted olefin monomer incorporation in the invention copolymer will vary according to process conditions, particularly comonomer concentrations used in copolymerization but can achieve levels including the low levels taught in the prior art, e.g., from zero (in the absence of comonomer) to 1.3 or 2.8 mol. %, and can readily exceed those, e.g., 3.0 to about 50 mol. %. Amounts of from charged 8 to 44 mol. % are exemplified in this application and are representative.

Depending upon the level of incorporated geminally disubstituted olefin monomer, or monomers, and selection of comonomer, polymers ranging from crystalline (ethylene copolymers) to elastomeric can be prepared in accordance with the invention. Use of the term "elastomer" or "elastomeric" is meant in this application as recognized in the art, that is the copolymers are largely amorphous, they do not contain a significant amount of crystalline segments, for example not more than 15wt. %. A typical description of elastomeric ethylene-α-olefin copolymers with respect to crystallinity appears in co-pending application 08/545,973, filed Sep. 25, 1995, now abandoned the teachings of which are incorporated by reference for purposes of U.S. patent practice. As will be apparent to one of skill in the art, disruption of any polyethylene crystalline structure, can also or additionally be achieved by the further incorporation of the other coordination polymerization monomers capable of copolymerization with the polymerization catalyst of the invention.

The α-olefin monomers, either with or replacing ethylene, can be present in the copolymers of the invention in amounts of from about 50 mol % to 99.9 mol %. Thus traditional ethylene-propylene rubber type polymers, typically having propylene contents from 8 to 50 mol %, can be prepared with a geminally disubstituted monomer, e.g., isobutylene, replacing propylene. Other α-olefins and coordination polymerizable monomers maybe incorporated in minor amounts, typically less than 20 mol %. Additionally, polymers comprising one or more geminally disubstituted monomers and only C$_3$–C$_{20}$ α-olefins, plus minor amounts of other coordination polymerizable monomers can be prepared. So long as the geminally disubstituted monomers are present in the molar amount above, the polymers comprising them can have any remaining amount as the one or more of the C$_3$–C$_{20}$ α-olefins, e.g., 50–90 mol % α-olefins.

The copolymers of the invention will have an M$_n$ (number-average molecular weight) value from about 300 to 300,000 Daltons, typically between from about 700 to 200,000 Daltons, and more typically less than 100,000 Daltons. For low weight molecular weight applications, such as those copolymers useful in lubricating and fuel oil compositions, an M$_n$ of 300 to 15,000 is preferred, and more preferably less than or equal to 10,000.

The geminally disubstituted olefins useful in accordance with the invention include essentially any having the generic formula

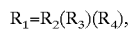

$$R_1=R_2(R_3)(R_4),$$

where R$_1$ is CH$_2$, R$_2$ is C, and R$_3$ and R$_4$ are, independently, essentially hydrocarbyl groups containing at least one carbon atom bound to R$_2$. Preferably R$_3$ and R$_4$ are linear, branched or cyclic, substituted or unsubstituted, hydrocarbyl groups having from 1 to 100 carbon atoms, preferably 30 or less carbon atoms, and optionally R$_3$ and R$_4$ are connected to form a cyclic structure. Thus the term geminally disubstituted olefins includes both monomers, such as isobutylene, and macromers having the representative structure above. Though R$_3$ and R$_4$ are to be essentially hydrocarbyl, the inclusion of non-hydrocarbyl atoms (such as O, S, N, P, Si, halogen etc.) is contemplated where such are sufficiently far removed from the double-bond so as not to interfere with the coordination polymerization reactions with the catalyst and so as to retain the essentially hydrocarbyl characteristic of being largely soluble in hydrocarbon solvents. The geminally substituted olefins specifically include isobutylene, 3-trimethylsilyl-2-methyl-1-propene, 2-methyl-1-butene, 2-methyl-1-pentene, 2-ethyl-1-pentene, 2-methyl-1-hexene, 2-methyl-1-heptene, 6-dimethylamino-2-methyl-1-hexene, α-methylstyrene and the like as representative compounds.

The coordination polymerizable monomers which may be copolymerized in accordance with the invention include one or more of: $C_3$ and higher α-olefins, styrene and hydrocarbyl-substituted styrene monomers wherein the substituent is on the aromatic ring, $C_6$ and higher substituted α-olefins, $C_4$ and higher internal olefins, $C_4$ and higher diolefins, and $C_5$ and higher cyclic olefins and diolefins. Preferred α-olefins include α-olefins having 3 to 30 carbon atoms, preferably 3 to 20 carbon atoms, but 1-olefin macromers having more than 30 carbon atoms, up to about 100 carbons atoms and more can similarly be used.

Preferred α-olefins thus include propylene, 1-butene, 1-pentene, 1-hexene, 1-heptene, 1-octene, 1-nonene, 1-decene, 1-dodecene, 4-methyl-1-pentene, 5-methyl-1-nonene, 3-methyl-1-pentene, 3,5,5-trimethyl-1-hexene, and vinylcyclohexane. Styrene and paramethylstyrene are preferred styrenic olefins. Preferred diolefins include those described in the literature for ethylene copolymers, specifically for EP and EPDM rubber, the disclosure of copending application Ser. No. 08/545,973, filed Oct. 20, 1995, is particularly relevant in this reoard and is incorporated by reference for purposes of U.S. patent practice. Examples include straight chain acyclic diolefins, branched acyclic diolefins, single ring alicyclic diolefins, multi-ring alicyclic fused and bridged ring diolefins and cycloalkenyl-substituted alkenes. Preferred examples are 1,4-hexadiene, dicyclopentadiene, 5-ethylidene-2-norbornene, vinylcyclolhexene and 5-vinyl-2-norbornene.

The $C_6$ and higher substituted α-olefins include those containing at least one Group 13 to 17 atom bound to a carbon atom of the substituted α-olefin. Examples include allyltrimethylsilane, 4,4,4-trifluoro-1-butene, methyl alkyl ether, methyl allyl thiother, and dimethyl allyl amine. The use of functional group-containing α-olefins is also within the scope of the invention when such olefins can be incorporated in the same manner as are their α-olefin analogs. See, "Metallocene Catalysts and Borane Reagents in The Block/Graft Reactions of Polyolefins", T. C. Chung, et al, *Polym. Mater. Sci. Eng.*, v. 73, p. 463 (1995), and the masked α-olefin monomers of U.S. Pat. No. 5,153,282. Such monomers permit the preparation of both functional-group containing invention copolymers capable of subsequent derivatization and of functional macromers which can be used as graft and block type polymeric segments. All documents are incorporated by reference for purposes of U.S. patent practice.

Cyclic olefins capable of copolymerization in accordance with the invention include cyclopentene, norbornene, alkyl-substituted norbornenes, cyclohexene, cycloheptene and those further described in the background documents and patent literature, see WO 94/17113, copending U.S. Ser. No. 08/412,507, filed Mar. 29, 1995, and U.S. Pat. Nos. 5,270,393 and 5,324,801. These documents are as well incorporated by reference for purposes of U.S. patent practice.

Polymerization Process

The generic process for the preparation of the invention copolymers comprises contacting at least one of the geminally disubstituted olefin monomers and at least one olefinically unsaturated monomer, preferably ethylene or propylene or other α-olefin, optionally with one or more additional coordination polymerizable monomers, with a catalyst compound comprising a bridged bis(arylamido) Group 4 catalyst compound activated for olefin polymerization. The contacting can be conducted by combining the activated catalyst composition with the polymerizable monomers under suitable insertion, or coordination, polymerization conditions.

Without intending to limit the invention, it is believed that a catalyst structure, exemplified and described in both the documents above and in the description and examples below, acts to allow ready polymerization of the geminally disubstituted olefins, but principally from the unhindered approaches to the metal coordination center and in a manner dictated by the steric constraints of the catalyst compound ligand system and the steric structure of the geminally disubstituted olefins. The bulk or steric structure of an inserted geminally disubstituted olefin and the steric constraints of the catalyst ligand system during insertion may act to inhibit entry into the coordination center of the catalyst of an immediately subsequent geminally disubstituted olefin monomer. Thus insertion of a subsequent geminally disubstituted olefin is generally preceded by the insertion of ethylene or other α-olefin. The subsequent geminally disubstituted olefin is then not inhibited by the previously inserted monomer and can readily enter and be inserted. A copolymer results having the described sequence segments containing those that are essentially of alternating units. As an apparent result, the invention copolymer has an insignificant number of, that is essentially no, diads, triads, etc., comprising, holmopolyinerized, or sequentially polymerized, geminally disubstituted olefins.

For the copolymerization of weminally disubstituted olefins with ethylene, the preferred molar ratio of geminally disubstituted olefin to ethylene is from about 1000:1 to 1:1000, more preferably from about 500:1 to 1:20, even more preferably from 100:1 to 1:1. The optional coordination polymerizable monomers for the ethylene-containing polymers may be introduced in any ratio consistent with desired incorporation ratios. For $C_3$–$C_{20}$ α-olefin/geminally disubstituted olefin monomer polymers, the ratios can be the same with one more α-olefin replacing, the ethylene. Styrenic olefins, cyclic olefins and any copolymerizable monomers can similarly replace the ethylene. With cyclic mono olefins, some other copolymerizable monomer in addition to the geminally disubstituted olefin monomers is preferably present. The nature of both the geminally disubstituted olefin monomer and cyclic mono olefin monomers may likely preclude cyclic olefin/geminally disubstituted olefin monomer repeat units.

The bridged bis(arylamido) Group 4 catalyst compounds of the invention (prior to activation) are prepared in accordance with now well-known synthesis techniques from known starting, materials described in the documents listed above, and others in the patent literature. These compounds may be represented by the generic formula

I.

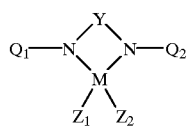

wherein:

M is Zr, Hf or Ti, preferably Ti;

Q₁ and Q₂ are independently phenyl groups, substituted phenyl groups or Group 15 analogs thereof, said substitution being essentially hydrocarbyl, preferably being a radical selected from hydrocarbyl, silyl-hydrocarbyl or germyl-hydrocarbyl having from 1 to 30 carbon, silicon or germanium atoms, or substituted hydrocarbyl, silyl-hydrocarbyl or germyl-hydrocarbyl radicals wherein one or more hydrogen atoms is replaced by a halogen radical, an amido radical, a phosphido radical, an alkoxy radical, an aryloxy radical or any other radical containing a Lewis acidic or basic functionality; halogen radicals; or alkylborido radicals; and, wherein two adjacent substituents may be covalently linked so as to form a fused ring system;

Y is a bridging group having a backbone of 2–4 Group 14–16 element atoms forming 5–7 member metallocycle with the Group 4 transition metal and the two amido-ligands, said atoms being unsubstituted or substituted with one or more essentially hydrocarbyl group R' defined as are R₁ and R₂, and further wherein said R' group may be a an alicyclic or aryl fused or pendent ring structure, including Group 15 analogs thereof.

$Z_1$ and $Z_2$ are independently monoanionic ligands selected from the group consisting of hydride; substituted or unsubstituted $C_1$ to $C_{30}$ hydrocarbyl; alkoxide; aryloxide; amide; halide or phosphide; Group 14 organometalloids; and include ligands where two X's together may form an alkylidene or cyclometallated hydrocarbyl or any other dianionic ligand;

Preferred compounds include those Group 4 metal compounds having ligands selected from the below listing.

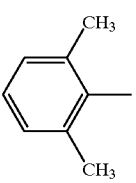

The bridged bis(arylamido) Group 4 catalyst compounds of the invention may be activated for polymerization catalysis in any manner sufficient to allow coordination polymerization. This can be achieved for example when one Z ligand can be abstracted and the other Z will either allow insertion of the unsaturated monomers or will be similarly abstractable for replacement with an Z that allows insertion of the unsaturated monomer. The traditional activators of metallocene polymerization art are suitable, those typically include Lewis acids such as alumoxane compounds, and ionizing, anion pre-cursor compounds that abstract one Z ligand so as ionize the transition metal center into a cation and provide a counter-balancing, compatible, noncoordinating anion.

Alkylalumoxanes are suitable as catalyst activators, particularly for the invention metal compounds comprising halide ligands. The alumoxane component useful as catalyst activator typically is an oligomeric aluminum compound represented by the general formula $(R''—Al—O)_n$, which is a cyclic compound, or $R''(R''—Al—O)_n AlR''_2$, which is a linear compound. In the general alumoxane formula R" is independently a $C_1$ to $C_{10}$ alkyl radical, for example, methyl, ethyl, propyl, butyl or pentyl and "n" is an integer from 1 to about 50. Most preferably, R" is methyl and "n" is at least 4. Alumoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an alumoxane. Generally, however prepared, the reaction of an aluminum alkyl with a limited amount of water yields a mixture of the linear and cyclic species of the alumoxane. Methylalumoxanes are preferred. For further descriptions see, U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, 5,103,031 and EP 0 561 476 A1, EP 0 279 586 B1, EP 0 516 476 A, EP 0 594 218 A1 and WO 94/10180, each being incorporated by reference for purposes of U.S. patent practice.

When the activator is an alumoxane, the preferred transition metal compound to activator molar ratio is from 1:2000 to 1:10, more preferably from about 1:500 to 1:10, even more preferably from about 1:250 to 1:10 and most preferably from about 1:100 to 1:10.

The term "noncoordinating anion" as used for the ionizing, anion pre-cursor compounds is recognized to mean an anion which either does not coordinate to said transition metal cation or which is only weakly coordinated to said cation thereby remaining sufficiently labile to be displaced by a neutral Lewis base. "Compatible" noncoordinating anions are those which are not degraded to neutrality when the initially formed complex between the bridged bis (arylamido) Group 4 catalyst compounds and the ionizing, anion pre-cursor compounds decompose. Further, the anion will not transfer an anionic substituent or fragment to the cation so as to cause it to form a neutral four coordinate metallocene compound and a neutral by-product from the anion. Noncoordinating anions useful in accordance with this invention are those which are compatible, stabilize the metallocene cation in the sense of balancing its ionic charge in a +1 state, yet retain sufficient liability to permit displacement by an olefinically or acetylenically unsaturated monomer during polymerization. Additionally, the anions useful in this invention will be large or bulky in the sense of sufficient molecular size to partially inhibit or help to prevent neutralization of the metallocene cation by Lewis bases other than the polymerizable monomers that may be present in the polymerization process. Typically the anion will have a molecular size of greater than or equal to about 4 angstroms.

Descriptions of ionic catalysts, those comprising a transition metal cation and a non-coordinating anion, suitable for coordination polymerization appear in the early work in U.S. Pat. Nos. 5,064,802, 5,132,380, 5,198,401, 5,278,119, 5,321,106, 5,347,024, 5,408,017, WO 92/00333 and WO 93/14132. These teach a preferred method of preparation wherein metallocenes are protonated by an anion precursors such that an alkyl/hydride group is abstracted from a transition metal to make it both cationic and charge-balanced by the non-coordinating anion. Similar mechanisms for activation are suitable for the catalysts of the invention.

The use of ionizing ionic compounds not containing an active proton but capable of producing both the active transition metal cation and an noncoordinating anion is also known. See, EP-A-0 426 637, EP-A-0 573 403 and U.S. Pat. No. 5,387,568. Reactive cations other than the Bronsted acids include ferrocenium, silver, tropylium, triphenylcarbenium and triethylsilylium, or alkali metal or alkaline earth metal cations such as sodium, magnesium or lithium cations. A further class of noncoordinating anion precursors suitable in accordance with this invention are hydrated salts comprising the alkali metal or alkaline earth metal cations and a non-coordinating anion as described above. The hydrated salts can be prepared by reaction of the metal cation-non-coordinating anion salt with water, for example, by hydrolysis of the commercially available or readily synthesized $LiB(pfp)_4$ which yields $[Li•xH_2O][B(pfp)_4]$, where (pfp) is pentafluorophenyl or perfluorophenyl. These activation methods are also suitable.

Any metal or metalloid capable of forming a coordination complex which is resistant to degradation by water (or other Bronsted or Lewis Acids) may be used or contained in the anion. Suitable metals include, but are not limited to, aluminum, gold, platinum and the like. Suitable metalloids include, but are not limited to, boron, phosphorus, silicon and the like. The description of non-coordinating anions and precursors thereto of the documents of the foregoing paragraphs are incorporated by reference for purposes of U.S. patent practice.

An additional method of making the ionic catalysts of the invention uses ionizing anion pre-cursors which are initially neutral Lewis acids but form the cation and anion upon ionizing reaction with the Group 4 metal compounds, for example Iris(pentafluorophenyl) boron acts to abstract a hydrocarbyl, hydride or silyl ligand to yield a transition metal cation and stabilizing non-coordinating anion, see EP-A-0 427 697 and EP-A-0 520 732 for analogous methods. Ionic catalysts for coordination polymerization can also be prepared by oxidation of the metal centers of transition metal compounds by anionic precursors containing metallic oxidizing groups along with the anion groups, see EP-A-0 495 375. The description of non-coordinating anions and precursors thereto of these documents are similarly incorporated by reference for purposes of U.S. patent practice.

When the cation portion of an ionic non-coordinating precursor is a Bronsted acid such as protons or protonated Lewis bases (excluding water), or a reducible Lewis acid such as ferricinium or silver cations, or alkaline metal or alkaline earth metal cations such as those of sodium, magnesium or lithium cations, the transition metal to activator molar ratio may be any ratio, but preferably from about 10:1 to 1:10, more preferably from about 5:1 to 1:5, even more preferably from about 2:1 to 1:2 and most preferably from about 1.2:1 to 1:1.2 with the ratio of about 1:1 being the most preferred.

Since the geminally disubstituted olefins will tend to be polymerized carbocationically independently of the ethylene, and of many other coordination polymerizable monomers, when in the presence of a stable carbocation such as tropylium, triphenylcarbenium, hydrated alkaline metal or alkaline earth metals, or Lewis acids strong enough to liberate a proton from water, for example tris (pentafluorophenyl) boron, the above ratios are preferred only when the reaction system is essentially free of compounds capable of generating a proton, such as water or alcohols. If trace quantities of these compounds are present, the preferred transition metal compound to activator molar ratio is from 10:1 to 1:1, more preferably from about 5:1 to 1:1, even more preferably from about 2:1 to 1:1 and most preferably from about 1.2:1 to 1:1 with the ratio of 1.05:1 being the most preferred.

When the Z ligands are not hydride, hydrocarbyl or silylhydrocarbyl, such as chloride ligands and are not capable of discrete ionizing abstraction with the ionizing, anion pre-cursor compounds, these Z ligands can be converted via known alkylation reactions with organometallic compounds such as lithium or aluminum hydrides or alkyls, alkylalumoxanes, Grignard rearents, etc. See EP-A-0 500 944, EP-A1-0 570 982 and EP-A1-0 612 768 for analogous processes describing the reaction of alkyl aluminum compounds with dihalide substituted metallocene compounds prior to or with the addition of activating noncoordinating anion precursor compounds. Accordingly, a preferred catalytically active Group 4 transition metal catalyst component is a transition metal cation stabilized and counter-balanced with a non-coordinatin, anion as derived in any of the foregoing methods.

When using ionic catalysts comprising the invention Group 4 metal cations and non-coordinating anions, the total catalyst system will generally additionally comprise one or more scavenging compounds. The term "scavenging compounds" as used in this application and its claims is meant to include those compounds effective for removing polar impurities from the reaction environment. The term will also include proton scavengers to suppress competing carbocationic polymerization, see the description and illustrations of WO 95/29940. Impurities can be inadvertently introduced with any of the polymerization reaction components, particularly with solvent, monomer and catalyst feed, and adversely affect catalyst activity and stability. It can result in decreasing or even elimination of catalytic activity, particularly when a metallocene cation-noncoordinating anion pair is the catalyst system. The polar impurities, or catalyst poisons include water, oxygen, metal impurities, etc. Preferably steps are taken before provision of such into the reaction vessel, for example by chemical treatment or careful separation techniques after or during the synthesis or preparation of the various components, but some minor amounts of scavenging compound will still normally be used in the polymerization process itself.

Typically the scavenging compound will be an organometallic compound such as the Group-13 organometallic compounds of U.S. Pat. Nos. 5,153,157, 5,241,025 and WO-A-91/09882, WO-A-94/03506, WO-A-93/14132, and that of WO 95/07941. Exemplary compounds include triethyl aluminum, triethyl borane, triusobutyl aluminum, methylalumoxane, isobutyl aluminumoxane, and n-octyl aluminum, Those scavenging compounds having bulky or $C_8$–$C_{20}$ linear hydrocarbyl substituents covalently bound to the metal or metalloid center being preferred to minimize adverse interaction with the active catalyst. When alumoxane is used as activator, any excess over the amount of metallocene present will act as scavenger compounds and additional scavenging compounds may not be necessary. The amount of scavenging agent to be used with metallocene cation-noncoordinating anion pairs is minimized during polymerization reactions to that amount effective to enhance activity.

The catalyst according to the invention may be supported for use in gas phase, bulk, slurry polymerization processes, or otherwise as needed. Numerous methods of support are known in the art for copolymerization processes for olefins, particularly for catalysts activated by alumoxanes, any is suitable for the invention process in its broadest scope. See, for example, U.S. Pat. Nos. 5,057,475 and 5,227,440. An example of supported ionic catalysts appears in WO 94/03056. A particularly effective method is that described in co-pending application U.S. Ser. No. 08/474,948 filed Jun. 7, 1995, and WO 96/04319. A bulk, or slurry, process utilizing supported, bis-cyclopentadienyl Group 4 metallocenes activated with alumoxane co-catalysts is described as suitable for ethylene-propylene rubber in U.S. Pat. Nos. 5,001,205 and 5,229,478, these processes will additionally be suitable with the catalyst systems of this application. Both inorganic oxide and polymeric supports may be utilized in accordance with the knowledge in the field. See U.S. Pat. Nos. 5,422,325, 5,427,991, 5,498,582, 5,466,649, copending U.S. patent applications Ser. Nos. 08/265,532 and 08/265,533, both filed Jun. 24, 1995, and international publications WO 93/11172 and WO 94/07928. Each of the foregoing documents is incorporated by reference for purposes of U.S. patent practice.

In preferred embodiments of the process for this invention, the catalyst system is employed in liquid phase (solution, slurry, suspension, bulk phase or combinations thereof), in high pressure liquid or supercritical fluid phase, or in gas phase. Each of these processes may be employed in singular, parallel or series reactors. The liquid processes comprise contacting the ethylene and geminally disubstituted olefin monomers with the above described catalyst system in a suitable diluent or solvent and allowing said monomers to react for a sufficient time to produce the invention copolymers. Hydrocarbyl solvents are suitable, both aliphatic and aromatic, hexane and toluene are preferred. Bulk and slurry processes are typically done by contacting the catalysts with a slurry of liquid monomer, the catalyst system being supported. Gas phase processes similarly use a supported catalyst and are conducted in any manner known to be suitable for ethylene homopolymers or copolymers prepared by coordination polymerization. Illustrative examples may be found in U.S. Pat. Nos. 4,543,399, 4,588,790, 5,028,670, 5,382,638, 5352,749, 5,436,304, 5,453,471, and 5,463,999, and WO 95/07942. Each is incorporated by reference for purposes of U.S. patent practice.

Generally speaking the polymerization reaction temperature can vary from about 0° C. to about 250° C. Preferably the reaction temperature conditions will be from 0° C. to 220°, more preferably below 200° C. The pressure can vary from about 1 mm Hg to 2500 bar, preferably from 0.1 bar to 1600 bar, most preferably from 1.0 to 500 bar. Where lower molecular weight copolymers, e.g., $M_n \leq 10,000$, are sought it will be suitable to conduct the reaction processes at temperatures above about 0° C. and pressures under 500 bar. The multiboron activators of U.S. Pat. No. 5,278,119 can additionally be employed to facilitate the preparation of the low molecular weight copolymers of the invention.

As will be apparent to those skilled in the art the catalyst compounds and components of this invention may be mixed with other catalyst systems or used with series or parallel reactors employing one or more such catalyst systems to prepare polymer blends comprising one or more of invention copolymers or blends of them with other polymers and copolymers with properties associated with such blends, for example, broadened polydispersity for improved processing polymer compositions and improved impact strength polymer blend compositions.

Industrial Applicability

Low molecular weight α-olefin-containing copolymers are known to be useful as petroleum product additives and as components of adhesive and sealant compositions. And, since petroleum refining produces feedstreams that can be separated by fractionation into those comprising lower carbon number compounds (from 2 to 4 carbons), from those of higher carbon number compounds (five and above), and since the lower carbon number compounds will comprise both α-olefins and isobutylene, the ability to incorporate the isobutylene along with its analogs, 1-butene and 2-butene, contained in those feedstreams is industrially desired. See, for example, WO 93/24539, where isobutylene is apparently used as an unreactive diluent unless a carbocationic catalyst is added with the biscyclopentadienyl metallocene coordination catalysts.

The copolymers of the invention will be useful in low molecular weight embodiments as oleaginous composition modifiers, for example, fuel or lubricating oil additives, particularly when essentially elastomeric.

Additional uses will arise in fields traditionally using similar molecular weight ethylene-α-olefin copolymers of at least some ethylene crystallinity, such as linear low density and low density polyethylene copolymers of ethylene with 1-butene, 1-hexene or 1-octene. Films and packaging materials can be prepared from such copolymers by methods well-known in the art. Additionally, adhesive compositions can be prepared using the invention copolymers as replacements for higher α-olefin content copolymers prepared with metallocene catalysts, particularly those described as plastomers because of their elastomeric properties. As known in the art, such copolymers can be used as base polymers that with the addition of tackifier resins, waxes or plasticizers constitute to adhesive compositions useful in pressure-sensitive adhesive compositions, hot melt adhesive compositions and the like. See, for example, co-pending, U.S. application Ser. No. 08/410,656, filed Mar. 24, 1996, and Ser. No. 08/406,832, filed Mar. 20, 1995 and their International counterparts WO 92/12212 and WO 94/10256, each is incorporated by reference for purposes of U.S. patent practice.

EXAMPLES

In order to illustrate the present invention, the following examples are provided. Such are not meant to limit the invention in any respect, but are solely provided for illustration purposes.

The properties of the polymer were determined by the following, test methods:

All molecular weights are weight average molecular weight unless otherwise noted. Molecular weights (weight average molecular weight ($M_w$) and number average molecular weight ($M_n$)) were measured by Gel Permeation Chromatography, unless otherwise noted, using a Waters 150 Gel Permeation Chromatograph equipped with a differential refractive index detector and calibrated using polystyrene standards. Samples were run in either THF (45° C.) or in 1,2,4-trichlorobenzene (145° C.) depending upon the sample's solubility using three Shodex GPC AT-80 M/S columns in series. This general technique is discussed in "Liquid Chromatography of Polymers and Related Materials III" J. Cazes Ed., Marcel Decker, 1981, page 207, which is incorporated by reference for purposes of U.S. patent practice herein. No corrections for column spreading were employed; however, data on generally accepted standards, e.g. National Bureau of Standards Polyethylene 1475, demonstrated a precision with 0.1 units for $M_w/M_n$ which was calculated from elution times. The numerical analyses were performed using Expert Ease' software available from Waters Corporation.

All polymerizations were carried out under nitrogen using anhydrous solvents. Isobutylene and 2-methyl-1-pentene were dried by passing the vapor or liquid through columns packed with barium oxide and, for isobutylene, condensing the gas in a bath cooled to below the boiling point of isobutylene (b.p.~−10° C.). Ethylene was purchased in 99.9% purity and used as received. Solvent and scavenger, if used, were combined directly into the reaction vessel at ambient pressure and allowed to mix for at least 5 minutes prior to the introduction of isobutylene. Isobutylene was collected as a condensed liquid. A known volume of isobutylene was added to the reactor at a temperature below its boiling point or forced into the reactor with pressure from a pressurized cylinder. Ethylene was added to the reactor as a (as at a pre-determined pressure. Propylene was similarly added. The pressures listed in the tables are differential pressures defined as the difference between the nascent reactor pressure before ethylene addition and the ethylene gauge pressure. Catalysts were activated outside of the reactor in a small volume of solvent (~2 ml).

$M_n$ values are reported as polystyrene equivalents. $^1$H- and decoupled $^{13}$C-NMR spectroscopic analyses were run in either CDCl$_3$ or toluene-d$_8$ at ambient temperature using a field strength of 250 MHz ($^{13}$C—63 MHz) or in tetrachloroethane-d$_2$ at 120° C. using a field strength of 500 MHz ($^{13}$C—125 MHz) depending upon the sample's solubility. Incorporation (mol %) of isobutylene into the copolymers with ethylene of examples 1 through 12 were determined by comparison the integration of the methyl proton resonances with those of the methylene proton resonances using the equation below.

$$\text{mol \%} IB = 100 \times (4A)/(6B+2A)$$

where:
A: integration of the methyl resonances
B: integration of the methylene resonances Higher carbon number comonomer incorporation was calculated with the equations below.

Equation for isobutylene incorporation with propylene $$\text{mol \%} 1B = \frac{(C-5D)}{(C+3D)} \times 100$$

where
C: integration between 0.7 and 1.4 ppm
D: integration between 1.4 and 1.7 ppm both determined in CDCl$_3$ Equation for isobutylene incorporation with 1-hexene $$\text{mol \%} 1B = \frac{(9E-3F)}{(7E+3F)} \times 100$$

where:
E: integration of the methyl resonances
F: integration of the methylene and methine resonances Examples The catalyst precursor compounds shown below were used in the examples.

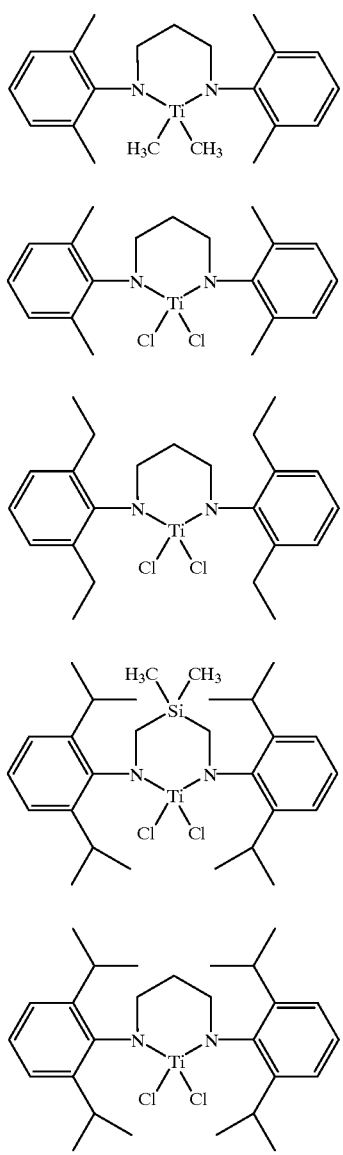

A.

B.

C.

D.

E.

The reactions were carried out in autoclaves between 20 and 30° C. using hexane as a catalyst transfer solvent and isobutylene as monomer and solvent. All monomers and solvents are dried using conventional dry box techniques. Example 1 is given as a representative procedure for an ethylene/isobutylene copolymerization. Examples 2–18 are performed similarly using different types and amounts of catalyst, activator and comonomer. These variations are noted for Examples 2–18 in Table 1.

Example 1

Two 240 mg aliquots of neat MAO were weighed out. One aliquot was combined with 50 ml of liquid isobutylene at −30° C. in the reactor. The other aliquot of MAO was combined with 30 mg of A which was dissolved into 1 ml of hexane. The activator and catalyst were allowed to mix for 5 minutes. This slurry was then placed into the reactor. The reactor was subsequently sealed and warmed to 21° C. At this temperature, ethylene was added to raise the pressure in the reactor an additional 10 psi over that without ethylene. The reaction was stirred for 960 minutes. The vessel was then depressurized and 1 ml of methanol was added. The polymer was dissolved into toluene and reprecipitated into methanol. The product was finally dried in vacuo. Yield: 41.0 g. This copolymer contained 39 mol % IB by $^1$H-NMR (250 Mhz).

Examples 2–17

These examples were run under the conditions of Example 1 but with substitutions as listed in Table 1.

TABLE 1

| Rxn. | Comonomer Press. (psi)$^a$ | Catalyst$^b$ (mmol) | Activator$^c$ (mmol) | Time (min.) | Yield (g) | mol % IB Incorporated | $M_n$ | $M_w/M_n$ |
|---|---|---|---|---|---|---|---|---|
| 1 | E, 10 | A, 0.084 | S, 8.3 | 960 | 41.0 | 39 | 11,800 | 2.4 |
| 2 | E, 20 | B, 0.075 | L, 10.5 | 65 | 11.2 | 39 | 2100 | 2.6 |
| 3 | E, 20 | C, 0.066 | S, 6.6 | 120 | 14.0 | 33 | 7270 | 2.2 |
| 4$^d$ | E, 20 | C, 0.066 | S, 6.6 | 120 | 20.6 | 38 | 4310 | 2.3 |
| 5$^e$ | E, 20 | C, 0.066 | S, 6,6 | 120 | 0 | — | — | — |
| 6 | E, 20 | C, 0.066 | S, 0.33 | 120 | 0 | — | — | — |
| 7 | E, 20 | C, 0.066 | S, 1.65 | 120 | 1.1 | 22 | 8460 | 1.9 |
| 8 | E, 20 | C, 0.066 | S, 4.95 | 120 | 6.5 | 27 | 8640 | 2.4 |
| 9 | E, 20 | C, 0.066 | S, 13.2 | 120 | 17.5 | 38 | 4630 | 2.2 |
| 10 | E, 20 | D, 0.059 | S, 5.9 | 65 | 2.5 | 32 | 2520 | 2.1 |
| 11 | E, 20 | E, 0.054 | S, 5.4 | 65 | 1.1 | 24 | 4300 | 2.1 |
| 12 | P, 10 | A, 0.056 | S, 5.5 | 95 | 4.0 | 24 | 7940 | 1.9 |
| 13 | P, 10 | B, 0.075 | L, 10.5 | 65 | 1.9 | 18 | 1240 | 2.0 |
| 14 | P, 10 | C, 0.066 | S, 6.6 | 65 | 4.5 | 12 | 4700 | 2.1 |
| 15 | P, 10 | D, 0.059 | S, 5.9 | 65 | 4.2 | 8 | 3410 | 2.8 |
| 16 | P, 10 | E, 0.054 | S, 5.4 | 65 | 0.5 | 9 | 6290 | 2.3 |

TABLE 1-continued

| Rxn. | Comonomer Press. (psi)[a] | Catalyst[b] (mmol) | Activator[c] (mmol) | Time (min.) | Yield (g) | mol % IB Incorporated | $M_n$ | $M_w/M_n$ |
|---|---|---|---|---|---|---|---|---|
| 17 | H, 1.35 | B, 0.075 | L, 5.3 | 73 | 0.9 | 44 | 550 | 1.3 |

All reactions run at 25° C. and with 50 ml of isobutylene unless otherwise indicated.
[a]comonomers - E: ethylene, P: propylene, H: 1-hexene (stated in grams not psi);
[b]A] 1,3-bis(2,6-dimethylphenylamido)propane titanium dimethyl; B] 1,3-bis(2,6-dimethylphenylamido)propane titanium dichloride; C] 1,3-bis (2,6-diethylphenylamido)propane titanium dichloride; D] 1,3-bis(2,6-diisopropylphenylamido)propane titianium dichloride; E] 1,3-bis(2,6-diisopropylphenylamido)methylene dimethylsilane titanium dichloride;
[c]S] solid MAO; L] 30 wt. % toluene solution of MAO;
[d]60° C.;
[e]–20° C.

We claim:

1. A process for the preparation of olefin copolymers containing at least one geminally disubstituted olefin monomer comprising contacting at least one geminally disubstituted olefin monomer and one or more comonomers selected from the group consisting of ethylene and $C_3$–$C_{20}$ α-olefins, optionally with one or more other coordination polymerizable monomers, under suitable coordination polymerization conditions with a catalyst system comprising a bridged bis(arylamido) Group 4 metal catalyst component, where the reaction temperature of the polymerization conditions is from about 0° C. to about 250° C.

2. The process of claim 1 wherein said bridged bis (arylamido) Group 4 catalyst component is derived from a compound represented by the generic formula

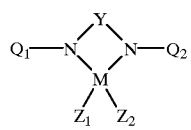

I.

wherein:

M is Zr, Hf or Ti, Ti;

$Q_1$ and $Q_2$ are independently phenyl groups, substituted phenyl groups or Group 15 analogs thereof, said substitution being a radical selected from hydrocarbyl, silyl-hydrocarbyl or germyl-hydrocarbyl having from 1 to 30 carbon, silicon or germanium atoms, or substituted hydrocarbyl, silyl-hydrocarbyl or germyl-hydrocarbyl radicals wherein one or more hydrogen atoms is replaced by a halogen radical, an amido radical, a phosphido radical, an alkoxy radical, an aryloxy radical or any other radical containing a Lewis acidic or basic functionality; halogen radicals; or alkylborido radicals; and, wherein two adjacent substituents may be covalently linked so as to form a fused ring system;

Y is a bridging group having a backbone of 3–4 Group 14–16 element atoms forming 6–7 member metallocycle with the Group 4 transition metal and the two amido-ligands, said atoms being unsubstituted or substituted with one or more hydrocarbyl group R' defined as are $R_1$ and $R_2$, and further wherein said R' group may be a an alicyclic or aryl fused or pendent ring structure, including Group 15 analogs thereof;

$Z_1$ and $Z_2$ are independently monoanionic ligands selected from the group consisting of hydride, substituted or unsubstituted $C_1$ to $C_{30}$ hydrocarbyl, alkoxide, aryloxide, amide, halide or phosphide, and Group 14 organometalloids; and include ligands where two X's together may form an alkylidene or cyclometallated hydrocarbyl or any other dianionic ligand.

3. The process of claim 1 wherein said other coordination polymerizable monomers comprise at least one member of the group consisting of $C_3$–$C_{30}$ α-olefins, $C_6$ and higher substituted α-olefins, $C_5$ and higher cyclic olefins, and $C_4$ and higher diolefins.

4. The process of claim 1 wherein said geminally disubstituted olefin monomer is isobutylene or 2-methyl-1-pentene.

5. The process of claim 4 wherein said other coordination polymerizable monomers comprise at least one member of the group consisting of $C_3$–$C_{30}$ α-olefins, $C_6$ and higher substituted α-olefins, $C_5$–$C_{30}$ cyclic olefins, and $C_4$–$C_{30}$ diolefins.

6. The process of claim 1 wherein said bridged bis (arylamido) Group 4 catalyst component is a cation stabilized and counter-balanced with a non-coordinating anion.

7. The process of claim 1 wherein said bridged bis (arylamido) Group 4 catalyst component has been activated with an alkyl alumoxane and the molar ratio of the Group 4 catalyst component to the alumoxane is from about 1:2000 to 1:10.

8. The process of claim 1 or 2 wherein said bridged bis(arylamido) Group 4 catalyst component is a titanium catalyst component.

9. A process for the preparation of olefin copolymers comprising contacting under suitable coordination polymerization conditions isobutylene and one or more comonomers selected from the group consisting of ethylene and $C_3$–$C_8$ α-olefins with a catalyst system comprising a bridged bis (arylamido) titanium catalyst component activated with alumoxane compounds or ionizing, anion precursor compounds, where the reaction temperature of the polymerization conditions are from 0° C. to 200° C.

10. The process of claim 9 wherein said titanium catalyst component is activated with alumoxane compounds and the molar ratio of the titanium catalyst component to the alumoxane is from about 1:2000 to 1:10.

11. The process of claim 10 wherein said comonomers are selected from the group consisting of ethylene, propylene and hexene.

12. The process of claim 9 wherein said titanium catalyst component is activated with ionizing, anion precursor compounds.

13. The process of claim 12 wherein said comonomers are selected from the group consisting of ethylene, propylene and hexene.

14. A process for the preparation of olefin copolymers containing at least one geminally disubstituted olefin monomer comprising contacting at least one geminally disubstituted olefin monomer and one or more comonomers selected from the group consisting Of $C_3$–$C_{20}$ α-olefins, optionally with one or more other coordination polymerizable monomers, under suitable coordination polymerization conditions with a catalyst system comprising a bridged bis (arylamido) Group 4 catalyst component, where the reaction temperature of the polymerization conditions is from 0° C. to 250° C.

15. A process for the preparation of olefin copolymers comprising contacting under suitable coordination polymerization conditions isobutylene and one or more comonomers selected from the group consisting of $C_3$–$C_8$ α-olefins with a catalyst system comprising a bridged bis(arylamido) titanium catalyst component activated with alumoxane compounds or ionizing, anion precursor compounds, where the reaction temperature of the polymerization conditions are from about 0° C. to about 200° C.

16. The process of claim 14 wherein said comonomers are selected from the group consisting of propylene and hexene.

* * * * *